(12) United States Patent
Hecker

(10) Patent No.: US 8,778,064 B2
(45) Date of Patent: Jul. 15, 2014

(54) GREEN HOUSE GASES FILTRATION SYSTEM

(76) Inventor: Eugene Hecker, Sandy, UT (US)

( * ) Notice: Subject to any disclaimer, the term of this patent is extended or adjusted under 35 U.S.C. 154(b) by 1635 days.

(21) Appl. No.: 12/116,545

(22) Filed: May 7, 2008

(65) Prior Publication Data

US 2008/0282655 A1 Nov. 20, 2008

Related U.S. Application Data

(60) Provisional application No. 60/938,313, filed on May 16, 2007.

(51) Int. Cl.
*B01D 47/06* (2006.01)

(52) U.S. Cl.
USPC ............ 96/240; 95/196; 96/265; 96/273; 96/277; 96/322

(58) Field of Classification Search
USPC ............ 55/466, 463–464; 210/513, 521, 536, 210/538; 95/197–198, 202, 205, 267; 96/273, 277, 265, 322, 240
See application file for complete search history.

(56) References Cited

U.S. PATENT DOCUMENTS

| | | | |
|---|---|---|---|
| 2,733,054 A | 1/1956 | Ackeren | |
| 3,057,137 A | 10/1962 | Perlis et al. | |
| 3,962,877 A * | 6/1976 | Schiemichen | 405/203 |
| 3,966,434 A | 6/1976 | Frazier | |
| 4,141,701 A * | 2/1979 | Ewan et al. | 95/217 |
| 4,144,040 A | 3/1979 | Claes et al. | |
| 4,157,969 A * | 6/1979 | Thies | 210/521 |
| 4,246,242 A | 1/1981 | Butler et al. | |
| 5,064,454 A | 11/1991 | Pittman | |
| 5,240,482 A * | 8/1993 | Sung | 96/235 |
| 5,421,846 A | 6/1995 | Klimczak | |
| 5,492,620 A * | 2/1996 | Evans | 210/96.1 |
| 6,733,575 B1 | 5/2004 | Lefever et al. | |
| 6,962,615 B2 | 11/2005 | Staudenmayer et al. | |
| 2003/0106609 A1* | 6/2003 | Leoncavallo | 141/340 |
| 2006/0098890 A1* | 5/2006 | Steinberg et al. | 382/255 |
| 2008/0098890 A1* | 5/2008 | Feher | 95/187 |
| 2009/0127176 A1* | 5/2009 | Cummins | 210/192 |

* cited by examiner

*Primary Examiner* — Duane Smith
(74) *Attorney, Agent, or Firm* — JP Webb; Jason P. Webb; Danny Y. H. Cheng

(57) ABSTRACT

A filtration system for filtering gas may comprise a liquid pump, wherein the liquid pump may be configured to pump liquid. The system may also include a spray nozzle, wherein the spray nozzle may be in fluid communication with the liquid pump. The spray nozzle may be configured to spray liquid on a gas stream; wherein the spray nozzle may be configured to spray horizontally. The system further includes a liquid collection basin, disposed near the spray nozzle, wherein the liquid collection basin may be configured to collect liquid after spraying on a gas stream. The system may additionally include a plurality of condensation drips disposed along a top of the liquid filter configured to condense any liquid which may evaporate during filtration and returns the condensed liquid to the chambers for filtration. The system may be a closed system, enabling liquid to be recycled throughout the system.

20 Claims, 6 Drawing Sheets

GREEN HOUSE GASES FILTRATION SYSTEM

CROSS-REFERENCE TO RELATED APPLICATIONS

Figure 1:
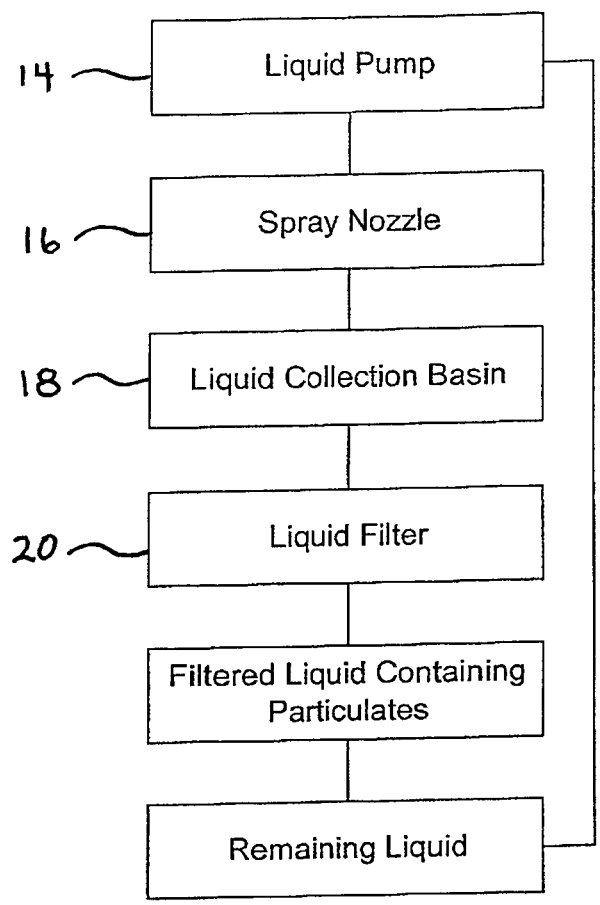
Figure 2:
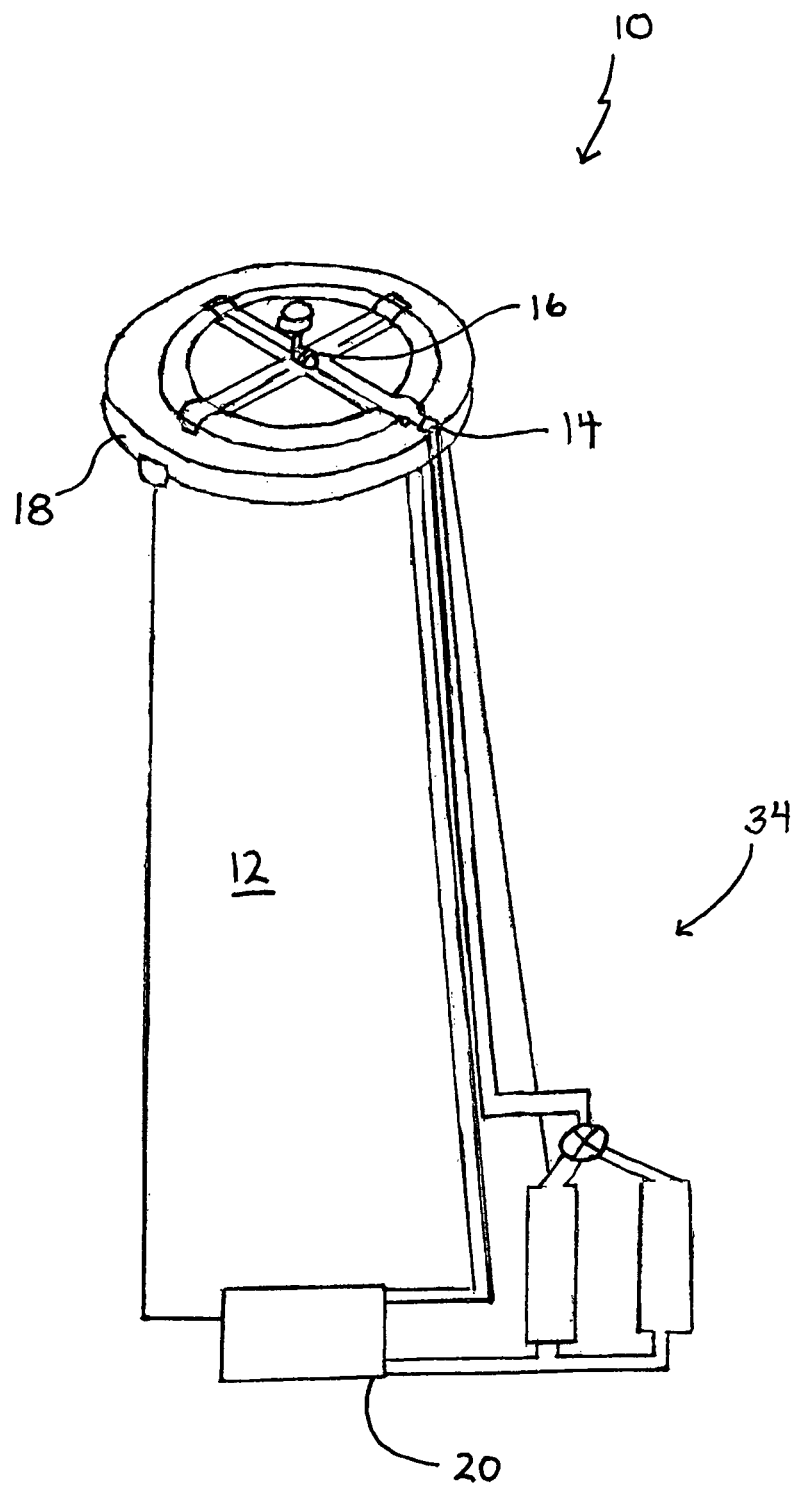
Figure 3:
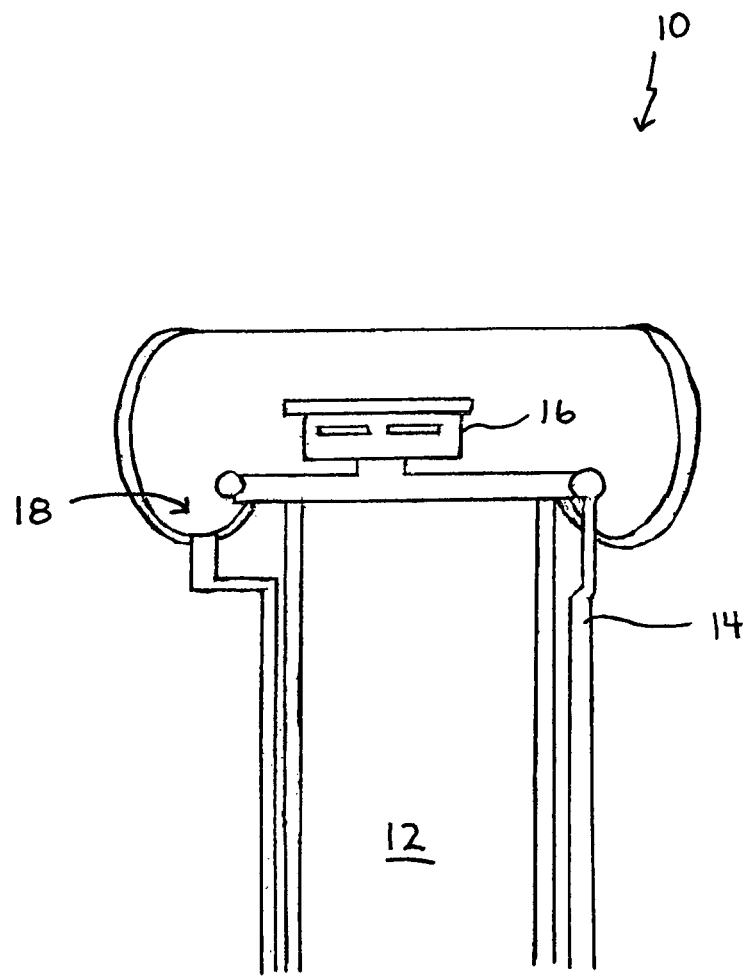
Figure 4:
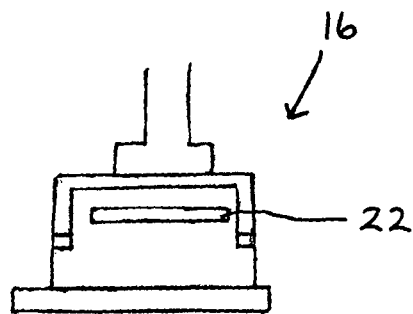
Figure 5:
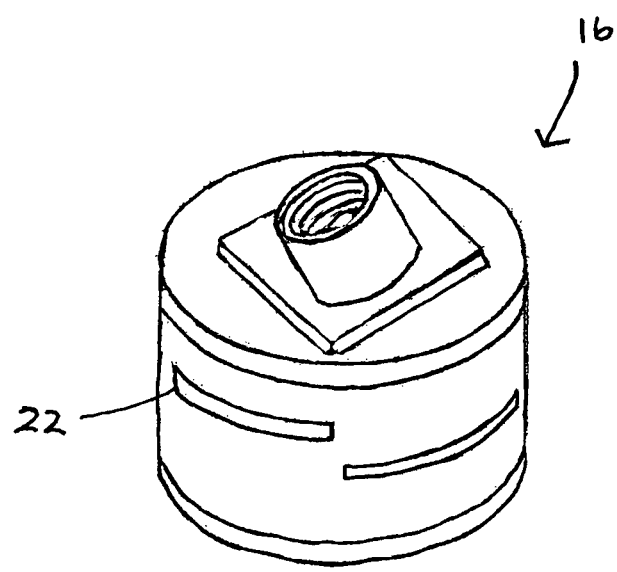
Figure 6:
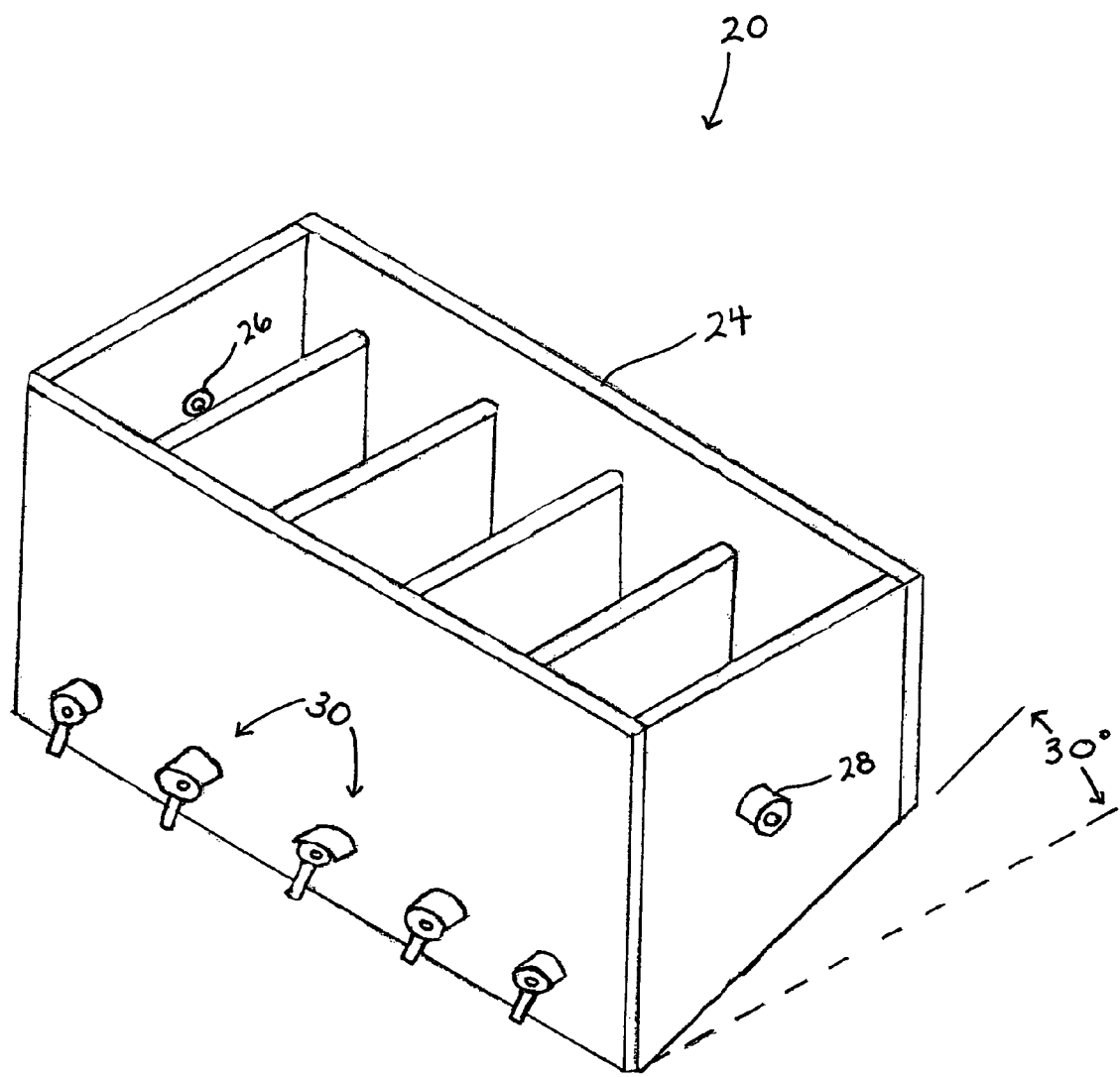
Figure 7:
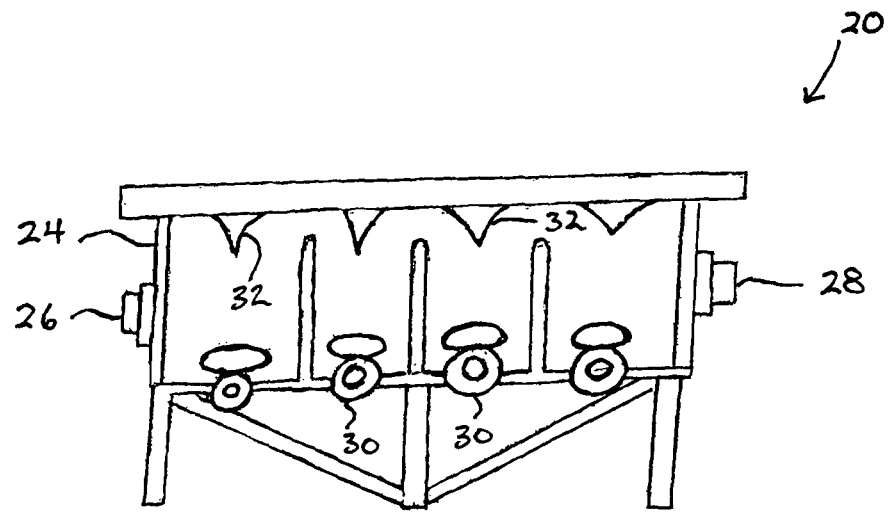
Figure 8:
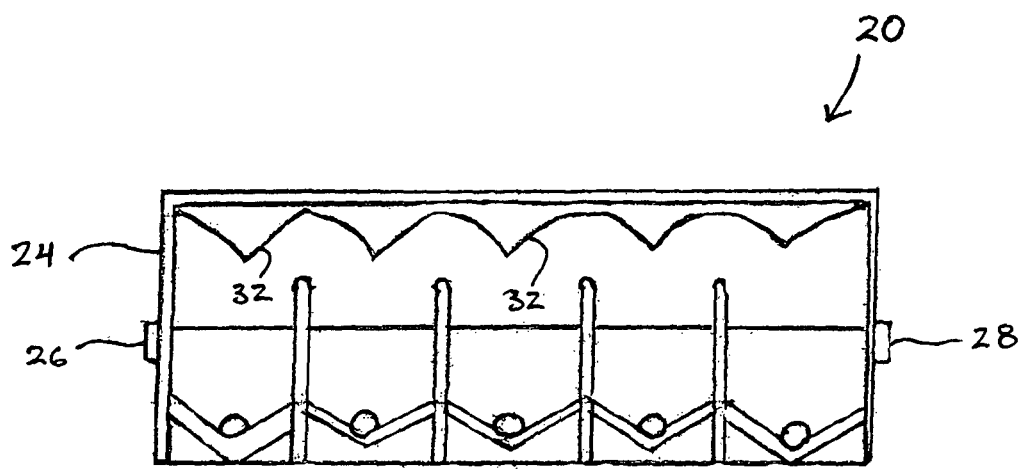

This invention claims priority, under 35 U.S.C. §120, to the U.S. Provisional Patent Application No. 60/938,313 to Hecker filed on May 16, 2007, which is incorporated by reference herein.

BACKGROUND OF THE INVENTION

1. Field of the Invention

The present invention relates to gas filtration, specifically to filtration systems for filtration of gas by spraying liquid.

2. Description of the Related Art

In many industries, there exists the problem of removing suspended particulates from a stream of gas which is to be vented to the atmosphere. For example, spent gases from combustion or drying installations, ventilation gases from dusty workshops, and waste gases from heavy organic basic chemistry are frequently loaded with soot, dust, or other harmful particles. Furthermore, stratospheric ozone depletion due to air pollution has long been recognized as a threat to human health as well as the Earth's ecosystems. In addition, air pollution is often the cause of respiratory disease, and, in some instances, death. Therefore, it is desirable to remove particulates from the vented gases prior to discharge to avoid atmospheric pollution.

Gas filtration is very common in industry, and usually aims to at least partially eliminate solid particles from the gas stream. As a result, various designs of different types of filtering equipment have been developed to remove pollutants, and other particulates from gas. The various approaches to filtration may generally be categorized as "wet" or "dry." With dry methods, particulate matter in a gas stream is removed by physical separation. This is ordinarily effected through the use of filters, electrostatic precipitators, or centrifugal separators such as cyclones. While dry methods of separation have several desirable attributes, they have no utility in removing vapors or gaseous contaminants from a gas stream.

Wet separation methods, on the other hand, can be used to remove various gaseous and vaporous impurities, as well as solid materials from a gas stream. In particular, where acidic gaseous and vaporous impurities are present, the gas stream is often brought into contact with a liquid solution or slurry. During wet separation, a liquid solution, usually constituted of a water slurry bearing a basic reactant such as crushed limestone, is brought into intimate contact with a gas stream, such as by spraying. By vigorously intermixing the gas stream with the liquid solution, it is possible to react the liquid solution with the acidic impurity to produce a neutral product that is carried from the gas stream by the entraining liquid solution. Furthermore, a liquid solution is often intermixed with a gas stream to carry pollutants away from the gas stream for future filtration. Some improvements have been made in the field. Examples of references related to the present invention are described below, and the supported teachings of each reference are incorporated by reference herein:

U.S. Pat. No. 4,144,040, issued to Claes et al., discloses a method and apparatus for demisting gases wherein a stream of gas containing submicron liquid particles is caused to pass through a filter material comprising at least in part a material having a porosity of at least 0.985.

U.S. Pat. No. 6,733,575, issued to Lefever et al., discloses a a coal-fired power generation system including means for the production of coal-derived gas and a filter system for the filtration of this coal-derived gas. The filter system comprises at least one high temperature and, corrosion resistant filter. The filter is made from a Fe—Cr—Al based alloy further comprising at least one additional element selected from the group consisting of Sc, Y, Ti, Zr, Hf, V, Nb, Ta and the lanthanides.

U.S. Pat. No. 5,421,846, issued to Klimczak, discloses an air filtration apparatus for industrial applications is disclosed, which includes a front vertical wall which can be positioned to form one side of a work station. The interior of the housing is divided between an upper dirty air chamber which receives the contaminated air from the work station, and a lower clean air chamber. The dividing wall between the two chambers is in the form of a transverse panel which is inclined with respect to the horizontal, and a plurality of hollow pedestals extend upwardly from the transverse panel. Cartridge type filters are mounted upon the pedestals, with the open ends of the filters facing downwardly and being pressed against the pedestals by hand operated clamps so as to form a seal therebetween. A reverse pulse air cleaning system is also provided, which periodically injects a pulse of air upwardly into the lower open end of each of the filters, so as to periodically clean the collected particulates from the outer surfaces of the filters. The removed particles then drop onto the inclined transverse panel and slide therealong toward to the front vertical wall of the housing, where they may be readily removed.

U.S. Pat. No. 5,064,454, issued to Pittman, discloses an apparatus for the removal of asbestos or other matter from a gas stream in a conduit is disclosed. The apparatus includes at least two filter units installed in parallel to receive and filter the gas stream from the conduit, outlets for solid matter at the bottom of each filter unit, and first and second valves respectively on either side of each filter unit for isolating each filter unit for cleaning by compressed air jets when desired. Preferably, the apparatus includes a displacement chamber upstream of the filter units, with much of the asbestos being removed from the bottom thereof. The outlets at the bottom of each filter unit and the collecting and discharge area at the bottom of the displacement chamber are sealed from the surrounding environment, and the filtered solid matter is discharged into bags via at least one bagging unit sealed to the outlets and the discharge area. Preferably, third valves are provided at the solid matter outlet of each filter unit, and these outlets are connected back to the displacement chamber via a return conduit. Fourth valves from the filter unit are connected to a higher pressure gas source, such as the atmosphere in a vacuum system, so that the solid matter may be routed back to the displacement chamber by closing the first and second valves and opening the third and fourth valves.

U.S. Pat. No. 3,966,434, issued to Frazier, discloses a process for removing solids from a stream of gas comprising passing a solids-laden gas through a woven fabric filter bag, which bag is installed with longitudinal slack, wherein, during filtration, the differential pressure across the bag causes the bag to expand outwardly. During clean-off, the exhaust valve of the apparatus is closed and, as the differential pressure across the bag approaches zero, the bag becomes slack and the solids deposited on the filter surface disengage therefrom and drop, by gravity flow, to a collection bin. The exhaust valve is then opened and the step of removing solids from the gas stream is resumed.

U.S. Pat. No. 3,057,137, issued to Perlis et al., discloses a gas cleaning apparatus comprising, a pair of spaced elongated sectioned housings, filter elements in each section of said housings, an elongated inlet duct means located intermediate of and coextensive with said housings, said inlet duct means having an opening at one end thereof connectible to a source of gas to be cleaned and having a first plurality of openings communicating with said filter elements in said sectioned housings respectively, said inlet duct being progressively reduced in cross sectional area from said opening connectible to a source of gas to be cleaned to the other end thereof, elongated outlet duct means located intermediate of and coextensive with said housings, said outlet duct having an opening at one end thereof connectible to a suction means and a second plurality of lateral openings spaced longitudinally, said second plurality of openings in said outlet duct communicating with a third plurality of longitudinally spaced openings in said housings respectively, and said outlet duct being progressively reduced in cross sectional area from said opening connectible to said suction means to the other end thereof.

U.S. Pat. No. 6,962,615, issued to Staudenmayer et al., discloses a filter element composed of a nonwoven filter web of metal fibers affixed to a support body, in which the metal fibers of the filter web form an unsintered composite having a porosity of at least 90%. Preferably the metal fibers have a diameter of at most 4 .mu.m.

However, previous filtration devices and systems suffer from a number of disadvantages, which include: being expensive, being difficult to use, being ineffective, being inefficient, being difficult to handle, not being adaptable, being incapable of withstanding high temperatures, and/or being incapable of withstanding high pressures.

Accordingly, there exists a need for a filtration system that solves one or more of the problems herein described or that may come to the attention of one skilled in the art after becoming familiar with this specification

SUMMARY OF THE INVENTION

The present invention has been developed in response to the present state of the art, and in particular, in response to the problems and needs in the art that have not yet been fully solved by currently available a filtration system. Accordingly, the present invention has been developed to provide an filtration system that is efficient and effective in treating a column of gas.

A filtration system for filtering gas may comprise a liquid pump, wherein the liquid pump may be configured to pump liquid. The system may also include a spray nozzle, wherein the spray nozzle may be in fluid communication with the liquid pump. The spray nozzle may be configured to spray liquid on a gas stream; wherein the spray nozzle may be configured to spray horizontally. The system further includes a liquid collection basin, disposed near the spray nozzle, wherein the liquid collection basin may be configured to collect liquid after spraying on a gas stream. The system may additionally include a plurality of condensation drips disposed along a top of the liquid filter configured to condense any liquid which may evaporate during filtration and returns the condensed liquid to the chambers for filtration. The system may be a closed system, enabling liquid to be recycled throughout the system.

The filtration system may also include a liquid filter, in fluid communication with the liquid collection basin, wherein the liquid filter may be configured to filter particles from the liquid after spraying on a gas stream. The liquid filter may also include a plurality of chambers separated by partitions. a pipe for input of liquid; and a plurality of spouts configured to drain each chamber.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not therefore to be considered to be limiting of its scope, the invention will be described and explained with additional specificity and detail through the use of the accompanying drawing(s), in which:

FIG. 1 is a block diagram of a filtration system, according to one embodiment of the invention;

FIG. 2 is a front perspective view of a filtration system, according to one embodiment of the invention;

FIG. 3 is a perspective view of a filtration system, according to one embodiment of the invention;

FIG. 4 is a cross-sectional view of a filtration system, according to one embodiment of the invention;

FIG. 5 is a front elevational view of a spray nozzle, according to one embodiment of the invention;

FIG. 6 is a front perspective view of a liquid filter, according to one embodiment of the invention;

FIG. 7 is a front elevational view of a liquid filter, according to one embodiment of the invention; and FIG. 8 is a front elevational view of a liquid filter, according to one embodiment of the invention.

DETAILED DESCRIPTION OF THE INVENTION

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment or example is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates a filtration system 10 for filtering gas, according to one embodiment of the invention, wherein the system 10 includes a liquid pump 14; a spray nozzle 16, in fluid communication with the liquid pump 14; a liquid collection basin 18, disposed near the spray nozzle 16; and a liquid filter 20, in fluid communication with the liquid collection basin 18. The liquid pump 14 pumps liquid into the spray nozzle 16, wherein the spray nozzle 16 spays the liquid horizontally about the interior of a smoke stack 12 or other emission pathway. The liquid is then collected in the liquid collection basin 18, wherein the collected liquid is diverted to a liquid filter 20. The filter 20 separates the filtered liquid containing the undesired particles and discards of the undesired liquid, and the remaining liquid is then pumped back into the liquid pump 14 to be cycled back through the filtration system 10.

FIGS. 2-8 illustrate a filtration system 10 for filtering gas, according to one embodiment of the invention; wherein the illustrated filtration system 10 is configured to filter particulates from a gas stream. For example, as shown, the filtration system 10 may be coupled to a smoke stack 12, or other emission pathway, for filtration of a gas stream. Further, in one embodiment of the invention, the filtration system 10 includes: a liquid pump 14; a spray nozzle 16, in fluid communication with the liquid pump 14; a liquid collection basin 18, disposed near the spray nozzle 16; and a liquid filter 20, in fluid communication with the liquid collection basin 18.

As illustrated, the liquid pump 14 is configured to pump liquid. For example, the liquid pump 14 may be pressurized, such as the recirculating pumps of U.S. Pat. No. 2,733,054, issued to J. Van Ackeren, which is incorporated by reference herein. Similarly, the liquid pump 14 may be such as the pump of U.S. Pat. No. 4,246,242, issued to Butler et al., which is incorporated by reference herein. Also, one skilled in the art would recognize that the liquid pump 14 may be configured to pump any liquid appreciated in the art, such as, but not limited to: water, a water-limestone slurry, a water slurry, and other mineral slurries. In addition, one skilled in the art would appreciate that the filtration system 10 may include two or more pumps, which may be used for back-up, should a pump fail or need to be shut off for maintenance, change of a filter, etc.

The illustrated liquid pump 14 is in fluid communication with a spray nozzle 16. For example, one skilled in the art would recognize that the liquid pump 14 may be in communication with a spray nozzle 16 by a pipe, or pipes. As shown, the spray nozzle 16 is configured to spray liquid on a gas stream. For example, the spray nozzle 16 may be oriented such that the spray nozzle directs a spray, or stream, of liquid through a stream of gas in a direction substantially orthogonal to the direction of the stream of gas. Similarly, the spray nozzle 16 may be oriented for directing a liquid spray though a stream of gas in a direction substantially parallel to the direction of the stream of the gas, such as by showering. Accordingly, one skilled in the art would understand that the spray nozzle 16 may be disposed anywhere near a gas stream and still provide a liquid spray to a gas stream. For example, the spray nozzle 16 may be disposed internally to a gas stream, along a perimeter of a gas stream, outside a gas stream, etc. Likewise, one skilled in the art would appreciate that the spray nozzle 16 may have any shape and/or size appreciated in the art. For example, the spray nozzle 16 may be cylindrical, conical, cubed, and/or may have any number of holes, or slots, for spraying liquid. Furthermore, one skilled in the art would appreciate that the spray nozzle 16 may have a diffuser 22, or diffuser nozzle, for diffusing and/or channeling liquid in a particular direction. For instance, one skilled in the art would appreciate that the spray nozzle 16 may be such as the atomizing head of U.S. Pat. No. 4,246,242, issued to Butler et al., which is incorporated by reference herein.

As shown, the spray nozzle 16 sprays liquid through a gas stream, which liquid is then collected in a liquid collection basin 18. As illustrated, the liquid collection basin 18 is configured to collect liquid after spraying on a gas stream. For example, one skilled in the art would appreciate that the liquid collection basin 18 may be a trough for collecting liquid and/or directing liquid for filtration. In addition, the illustrated liquid collection basin 18 is continuous and is disposed around a perimeter of the spray nozzle 16. However, one skilled in the art would recognize that the liquid collection basin 18 may be disposed at any location which would enable the liquid collection basin 18 to collect liquid after it is sprayed from the spray nozzle 16 through a gas stream. Similarly, one skilled in the art would appreciate that the liquid collection basin 18 may have any size and/or shape and still collect liquid after spraying. Likewise, the filtration system 10 may have any number of liquid collection basins for liquid collection.

As illustrated, the liquid collection basin 18 is in fluid communication with a liquid filter 20, or liquid filters. For example, one skilled in the art would recognize that the liquid collection basin 18 may be in communication with the liquid filters 20 by a pipe, or pipes. For instance, one skilled in the art would understand that the pipes may be constructed of any material appreciated in the art, such as, but not limited to: metals such as stainless steel, copper, and aluminum; plastic; and glass. Similarly, one skilled in the art would understand that the pipes may have any configuration appreciated in the art for delivering liquid. For example, in one embodiment of the invention, the pipes are incorporated into a ladder, thereby providing a mechanism for climbing while simultaneously controlling the flow of liquid.

Also shown by the illustrations, the liquid filter 20 is configured to filter particles from liquid after spraying on a gas stream. As illustrated, the liquid filter 20 includes: a container 24 with a plurality of chambers separated by partitions, a pipe for input of liquid 26, a pipe for output of liquid 28, and a plurality of spouts 30, or faucets, for draining each chamber. As a result, liquid flows into the liquid filter 20 through the input pipe 26 filling up each chamber consecutively. As the liquid travels from chamber to chamber, the liquid is filtered by each chamber. For example, one skilled in the art would recognize that liquid containing particulates, such as liquid mercury, may be heavier than liquid that does not contain particulates, causing the liquid containing particulates to sink to the bottom of the chamber, and thereby enabling liquid that does not contain particulates to flow to the next chamber and out of the liquid filter 20. Accordingly, liquid is filtered by the liquid filter 20 when it exits the liquid filter 20 through the output pipe 28. Moreover, liquid that has been filtered and trapped by the chambers, such as liquid containing particulates, may be drained by the spouts 30. For example, it may be desirous to capture filtered liquid for various uses, such as, but not limited to, testing, removal of contaminants, disposal, and reuse. In addition, filtered liquid may be captured and drained into a basin (not illustrated), such as a pond.

The illustrated liquid filter 20 also includes a plurality of condensation drips 32 disposed along a top of the liquid filter 20 for condensing any liquid which may evaporate during filtration and returning the condensed liquid to the chambers for filtration. For example, the condensation drips 32 may be comprised of a plurality of peaks and valleys for collecting and distributing liquid vapor and liquid. In addition, the condensation drips 32 may prevent the formation of rust along a top surface of the liquid filter.

Furthermore, the illustrated liquid filter 20 is in communication with the liquid pump 14. Accordingly, the filtration system 10 may be a closed system 34, enabling liquid to be recycled throughout the system 10. Therefore, one skilled in the art would appreciate that the filtration system 10 and/or the liquid filter 20 may include any components from the following references, which are incorporated by reference herein: U.S. Pat. No. 2,733,054, issued to J. Van Ackeren; U.S. Pat. No. 3,057,137, issued to D. B. Perlis et al.; U.S. Pat. No. 3,666,434, issued to Frazier; U.S. Pat. No. 4,144,040, issued to Claes et al; U.S. Pat. No. 4,246,242, issued to Butler et al.; U.S. Pat. No. 5,064,454, issued to Pittman; U.S. Pat. No. 5,421,846, issued to Klimczak; U.S. Pat. No. 6,733,575, issued to Lefever et al.; and U.S. Pat. No. 6,962,615, issued to Staudenmayer et al.

In operation of one embodiment of the liquid filtration system 10, liquid is pumped from a liquid pump 14 to a spray nozzle 16. The liquid is then sprayed through a gas stream and collected in a liquid collection basin 18. Next, the liquid is drained from the liquid collection basin 18 and travels to a liquid filter 20. As the liquid flows into the liquid filter 20, heavy liquid, or liquid containing particulates, flows to the bottom of the filter 20, while liquid that does not contain particulates flows through the filter and back to the liquid pump 14. Then, the liquid containing particulates is drained from the liquid filter 20.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a spray nozzle disposed at a top of the filtration system, it is envisioned that the spray nozzle may be disposed anywhere near a gas stream and still spray the gas stream with liquid. For example, the spray nozzle may be disposed at a bottom of the filtration system. Accordingly, one skilled in the art would understand that the liquid collection basin may be disposed anywhere near the spray nozzle for collecting liquid, such as at a top or a bottom of the filtration system. As a result, one skilled in the art would also understand that the supply and drain pipes may have any length and/or configuration appreciated in the art for supplying liquid to the spray nozzle and draining liquid from the liquid collection basin. Likewise, one skilled in the art would recognize that liquid may be pump up or down through pipes along a gas stream.

Additionally, although the figures illustrate a filtration system with one liquid pump, one spray nozzle, one liquid collection basin, and two liquid filters, one skilled in the art would understand that the filtration system may have any number of components for filtering liquid. For instance, the filtration system may have two or more pumps, two or more spray nozzles, two or more liquid collection basins, and one or more liquid filters. It is also envisioned that there may be a plurality of liquid filters which are contained in a single housing.

It is further envisioned that the filtration system may include a variety of devices for maintenance and testing of the system. For example, the filtration system may include devices, such as, but not limited to: pressure gauges, thermometers, carbon dioxide emission readers, and other chemical and particulate detectors.

Furthermore, one skilled in the art would understand that the components of the system may be powered by a variety of energy providing devices and modules. For example, the system may be powered by: wind energy, solar energy, AC current, and/or DC current.

It is expected that there could be numerous variations of the design of this invention. For example, the pipes may be configured in a ladder for diffusing the flow of liquid and for providing a mechanism for climbing.

Finally, it is envisioned that the components of the filtration system may be constructed of a variety of materials. For example, the filtration system may be constructed of materials, such as, but not limited to: metal, metal alloys, glass, rubber, plastic, textiles and/or wood.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A filtration system for filtering gas, comprising:

a) a liquid pump, configured to pump liquid;

b) a spray nozzle, in fluid communication with the liquid pump, configured to spray liquid on a gas stream of a smoke stack;

c) a liquid collection basin, disposed near the spray nozzle, configured to collect liquid after spraying on a gas stream of a smoke stack; wherein the liquid collection basin is a continuous trough and is disposed around a perimeter of the spray nozzle; and d) a liquid filter, in fluid communication with the liquid collection basin, configured to filter particles from the liquid after spraying on a gas stream of a smoke stack.

2. The system of claim 1, wherein the spray nozzle is configured to spray horizontally.

3. The system of claim 1, wherein the system is selectably disposed along a perimeter of a column of gas.

4. The system of claim 1, wherein the liquid pump is pressurized.

5. The system of claim 1, wherein the spray nozzle is orientated to direct a spray or stream of liquid through a stream of gas in a direction that is substantially orthogonal to the direction of the stream of gas.

6. The system of claim 1, wherein the spray nozzle is orientated to direct a liquid spray or stream through a stream of gas in a direction that is substantially parallel to the direction of the stream of the gas.

7. The system of claim 1, wherein the spray nozzle is disposed internally to a gas stream0.

8. The system of claim 1, wherein the spray nozzle is disposed along a perimeter of a gas stream.

9. The system of claim 1, wherein the spray nozzle is disposed outside a gas stream.

10. The system of claim 1, wherein the liquid collection basin is continuous and is disposed around a perimeter of the spray nozzle.

11. The system of claim 1, wherein the liquid filter includes:
   a) a plurality of chambers separated by partitions; wherein the partitions are solid providing only an opening at the top of the plurality of chambers;
   b) a pipe for input of liquid; and
   c) a plurality of spouts configured to drain each chamber.

12. The system of claim 11, further includes a plurality of condensation drips disposed along a top of the liquid filter configured to condense any liquid which may evaporate during filtration and returns the condensed liquid to the chambers for filtration.

13. The system of claim 1, wherein the system is a closed system, enabling liquid to be recycled throughout the system.

14. A filtration system for filtering gas, comprising:
   a) a liquid pump, configured to pump liquid;
   b) a spray nozzle, in fluid communication with the liquid pump configured to spray liquid on a gas stream;

c) a continuous donut-shaped trough liquid collection basin, disposed near the spray nozzle, configured to collect liquid after spraying on a gas stream; and d) a liquid filter, in fluid communication with the liquid collection basin, configured to filter particles from the liquid after spraying on a gas stream; wherein the liquid filter includes:
   d1) a plurality of chambers separated by partitions;
   d2) a pipe for input of liquid; and
   d3) a plurality of spouts configured to drain each chamber.

15. The system of claim 14, wherein the spray nozzle is configured to spray horizontally.

16. The system of claim 14, wherein the spray nozzle is orientated to direct a liquid spray or stream through a stream of gas in a direction that is substantially parallel to the direction of the stream of the gas.

17. The system of claim 14, wherein the spray nozzle is disposed internally to a gas stream.

18. The system of claim 14, wherein the system further includes a plurality of condensation drips disposed along a top of the liquid filter configured to condense any liquid which may evaporate during filtration and returns the condensed liquid to the chambers for filtration.

19. The system of claim 14, wherein the system is a closed system, enabling liquid to be recycled throughout the system.

20. A filtration system for filtering gas, comprising:
   a) a liquid pump, configured to pump liquid;
   b) a spray nozzle, in fluid communication with the liquid pump and disposed outside of and over the top of a smoke stack, configured to spray liquid on a gas stream of the smoke stack; wherein the spray nozzle is configured to spray horizontally;
   c) a liquid collection basin, disposed near the spray nozzle, configured to collect liquid after spraying on a gas stream of the smoke stack and shaped as a continuous donut-shaped trough;
   d) a plurality of condensation drips disposed along a top of the liquid filter configured to condense any liquid which may evaporate during filtration and returns the condensed liquid to the chambers for filtration; wherein the system is a closed system, enabling liquid to be recycled throughout the system; and
   e) a liquid filter, in fluid communication with the liquid collection basin, configured to filter particles from the liquid after spraying on a gas stream; wherein the liquid filter includes:
      e1) a plurality of chambers separated by partitions; wherein the partitions are solid providing only an opening at the top of the plurality of chambers;
      e2) a pipe for input of liquid; and
      e3) a plurality of spouts configured to drain each chamber.

* * * * *